Nov. 11, 1952  J. W. OWENS  2,617,364
LOCOMOTIVE CONSTRUCTION
Filed May 22, 1947  3 Sheets-Sheet 1

INVENTOR
JAMES W. OWENS
BY Paul L. Keeher
ATTORNEY

Nov. 11, 1952 J. W. OWENS 2,617,364
LOCOMOTIVE CONSTRUCTION
Filed May 22, 1947 3 Sheets-Sheet 2

INVENTOR
JAMES W. OWENS
BY Paul L. Krohn
ATTORNEY

Nov. 11, 1952 — J. W. OWENS — 2,617,364
LOCOMOTIVE CONSTRUCTION
Filed May 22, 1947 — 3 Sheets-Sheet 3

INVENTOR
JAMES W. OWENS
BY Paul L. Krohn
ATTORNEY

Patented Nov. 11, 1952

2,617,364

UNITED STATES PATENT OFFICE 2,617,364

LOCOMOTIVE CONSTRUCTION

James Whitfield Owens, Beloit, Wis., assignor to Fairbanks, Morse & Co., Chicago, Ill., a corporation of Illinois Application May 22, 1947, Serial No. 749,670

3 Claims. (Cl. 105—62)

This invention relates to locomotive construction and is more particularly concerned with improvements in the structural assembly of the several components of superstructure for locomotives and the like and the assembly of these components to an underframe.

Heretofore, the general procedure for assembling and securing a locomotive superstructure to the underframe has been locally to pre-machine the surfaces of the underframe to provide a suitable surface for securing the frame elements of the superstructure, or for welding the superstructure thereto either locally or continuously. This procedure has been required due to the fact that the top surface of cast and fabricated underframes are either irregular or warped, or both. Moreover, the underframe possesses a certain degree of sag due to its own weight, and the weight of the machinery and other equipment mounted thereon prior to assembly of the superstructure. Additional underframe sag is caused by the superstructure and fuel load. Obviously the pre-machining of the underframe is expensive as it requires the use of milling or other types of machine tools which are specifically designed and adapted for the purpose. If the superstructure is mechanically assembled, the prepared surfaces are drilled and tapped to match holes provided in the frame of the superstructure whereby cap screws can be used for the attachment. If the superstructure is welded to the underframe, its removal is difficult, slow and expensive. In addition, continuity of both mechanically assembled and welded surfaces are usually required to obtain air, oil and water tightness.

The present invention is principally directed to improvements in the assembly of the superstructure components to the underframe structure such as will achieve a simplified procedure and avoid the several difficulties pointed out above.

More generally stated, the objects of this invention are to provide means for joining component parts of a structure without requiring special preparation of the abutting surfaces, so that the component parts are air, oil and water tight, when necessary, and can be easily separated for servicing or repair and accurately and readily re-assembled, and so that the component parts may be replaced by other similar parts to facilitate interchangeability in the manufacture thereof.

A further important object is to be found in the provision of pre-matched elements carried on the supporting structure and on the removable superstructure components and arranged in cooperative relations whereby irregularities, sag and warpage in the structure may be easily overcome with a minimum of machine work and special preparation of small and large surface areas.

Still another object hereof resides in the combination of features of the assembly which will best satisfy the above enumerated objects.

Other objects and important advantages will be specifically described in the following detailed description relating to one embodiment of the invention disclosed in the accompanying drawing, wherein:

Fig. 6 is a greatly enlarged and fragmentary sectional elevational view of a typical attachment assembly taken at line 6—6 in Fig. 5;

Fig. 7 is also an enlarged, fragmentary sectional elevational view of another typical attachment assembly taken at line 7—7 in Fig. 4;

Fig. 8 is an enlarged and fragmentary sectional elevational view taken at line 8—8 in Fig. 4, and Fig. 9 is an enlarged sectional view in section as taken at line 9—9 in Fig. 2.

Figure 1:
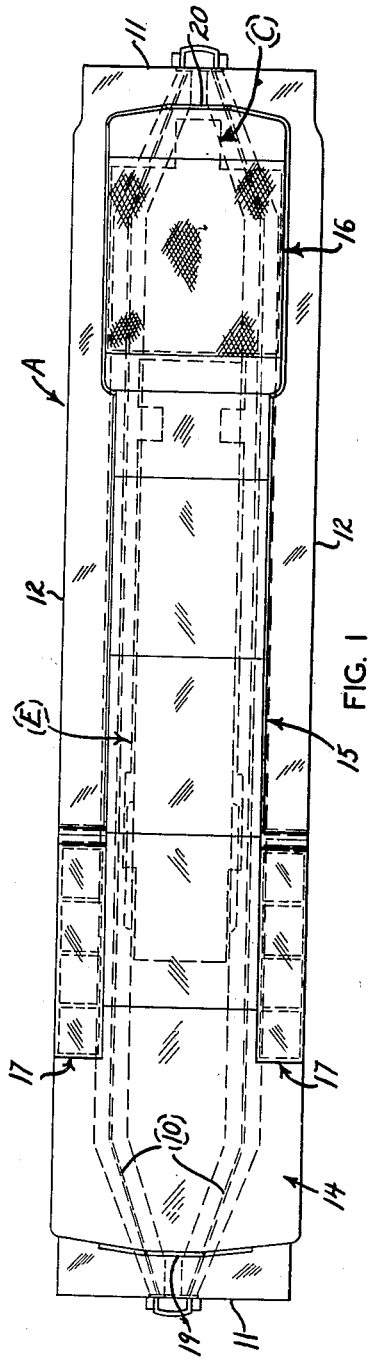
Fig. 1 is a top plan view of a locomotive having the superstructure assembled thereon in accordance with the principles of this invention.
Figure 2:
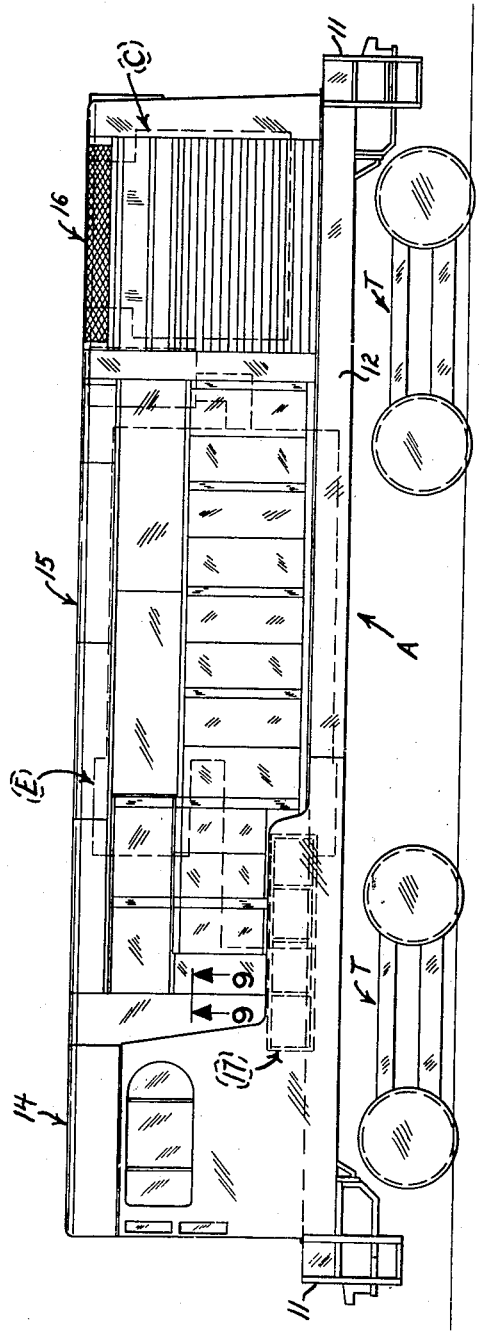
Fig. 2 is a side elevational view of the locomotive with the assembled superstructure.
Figure 3:
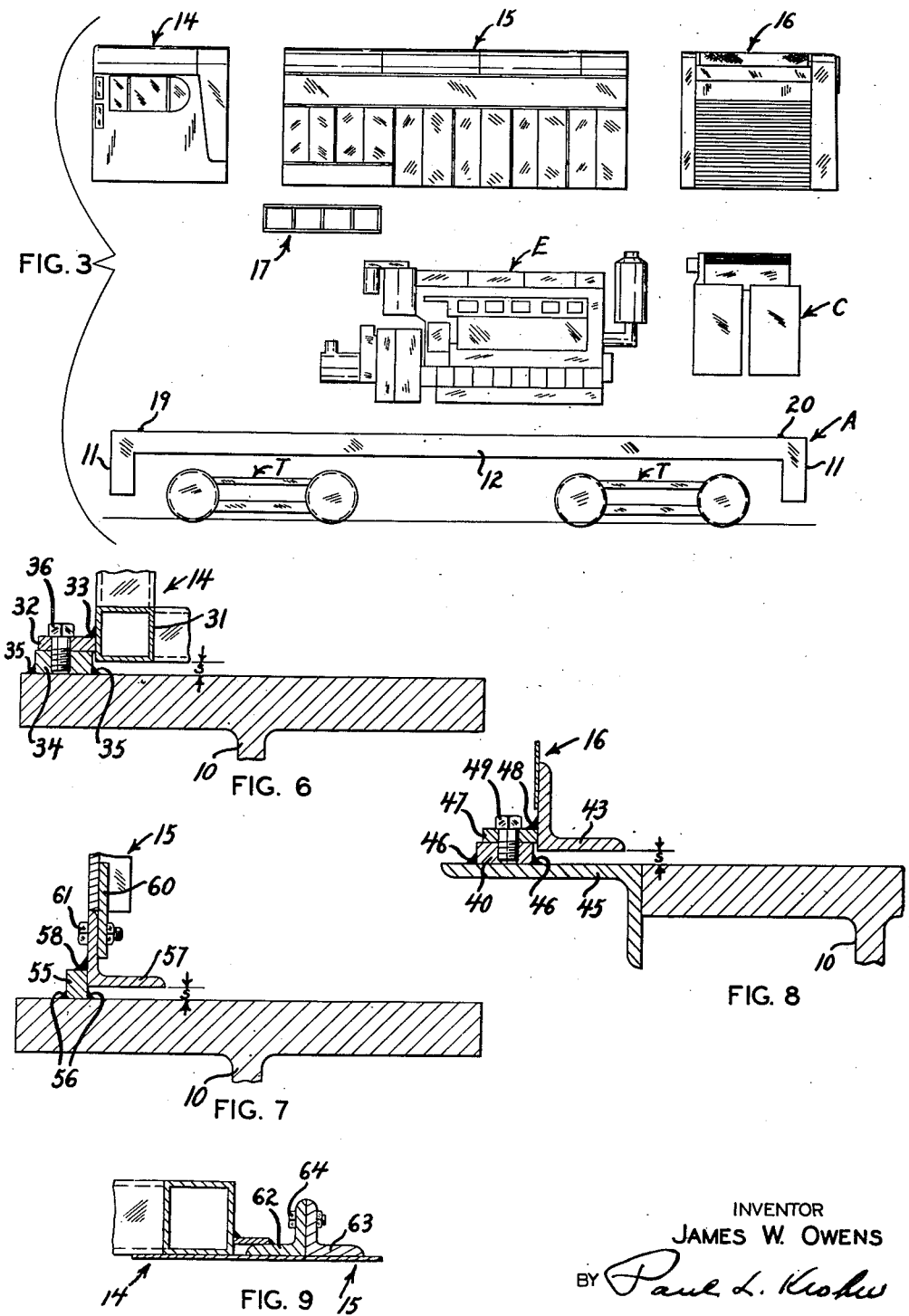
Fig. 3 is an exploded, side elevational view of the locomotive superstructure components, together with a showing of the underframe and certain items of machinery to be mounted on the underframe.

A broad understanding of the present locomotive underframe and superstructure assembly may be gained upon reference to Figs. 1 and 2, while in Fig. 3 the general relation of the several components of superstructure and machinery to be carried on the underframe can be seen to good advantage. In these views then, the locomotive underframe A includes the main longitudinal beams 10 which are convergently formed at the respective end portions to provide for securement of end sill assemblies 11, and side sill members 12 located outwardly of the beams 10 and extending between the end sills 11. The usual articulated trucks for the underframe A are indicated at T. Since the present embodiment illustrates a diesel-electric type locomotive, a conventional engine-generator unit E and engine cooling radiator and fan unit C are shown in Fig. 3 as the principal items of machinery to be mounted on underframe A prior to assembly of the superstructure. The superstructure assembly for this locomotive includes the several components, viz. the cab section 14, machinery sections or housing 15 and 16, and electric battery box sections 17. The machinery section 15 is normally longitudinally divided into right and left side sections, and thus only one of the side sections is shown in the exploded view, Fig. 3.

The conventional procedure in effecting a mechanical assembly of the several locomotive components has been to machine the upper longitudinal surfaces of the underframe to a predetermined true condition, and then mount the machinery followed by bolted attachment of the superstructure components, together with such parts as skirts, gutters and the like (not shown). Where the assembly is by welding, such components may be locally or continuously welded. According to the present improvements, expensive machining and permanent attachment by welding are eliminated, and all underframe sag, irregularities, and warp are fully accounted for by the use of pre-matched attachment elements of desired geometrical shapes and sizes which can be made up at small cost by the use of standard machine shop tools.

A preferred assembly procedure in the present instance, following mounting of the engine-generator unit E and cooling radiator unit C upon the underframe A, includes the location at opposite ends of the underframe (Fig. 3) of the matched members or attachment elements 19 and 20 which are welded directly to portions of the underframe beams 10 and extend from side-to-side from the longitudinal centerline thereof. In Fig. 5, element 19 is shown in position at the cab end of the underframe, and in Fig. 4, element 20 is shown in position at the radiator end thereof. The longitudinal spacing between these elements 19 and 20 is predetermined in accordance with the overall length of the components 14, 15 and 16 when properly assembled. In the case of the cab section 14, the lower marginal frame member 24 thereof (Fig. 5) is positioned with its outer face abutting the aforementioned matched attachment element 19. Similarly the frame member 25 (Fig. 4) of the cooling radiator housing section 16 is positioned in abutment with the matched attachment element 20. These superstructure housing sections 14 and 16 are also located above the top surface of the underframe to provide a gap or space of any desired small amount to allow for the greatest anticipated irregularities in the underframe and the sections to be mounted thereon. This gap or space is highly important as it eliminates the need for resting the superstructure directly upon the underframe and, as a consequence, does away with surface machining of the underframe in mechanical assemblies. The amount of physical separation of the superstructure and underframe is initially determined by proper selection of the thickness of the matched members or elements secured to the underframe.

In Fig. 5, the matched member or attachment element 19, welded to the underframe is flanked by other similar attachment elements 26, only one of the latter elements being visible, arranged in extended angular relation to conform to the outer end contour of the cab section 14, as shown. The lower peripheral cab frame member 24 carries in welded securement a series of matched members or attachment, elements 27 and 28 which abut respectively the elements 19 and 26, and are secured by a plurality of cap screws 29 threadedly engaging in the elements 19 and 26. A typical assembly detail view of this described matched member attachment better appears in Fig. 6 which is taken as indicated in view of Fig. 5. Thus a lower peripheral, box section, frame member 31 of certain interior wall structures of the cab section 14 is provided with a marginal attachment element 32 which is welded at 33. In matching relation, the underframe beam 10 carries an element 34 fixed to the upper surface of the beam flange at opposite longitudinal welds 35. These attachment elements 32 and 34 are held in their matched and superposed abutment by a plurality of cap screws 36 having threaded engagement in the underframe element 34. It can readily be seen in Fig. 6 that a gap or space S is provided between cab section member 31 and the upper flange surface of beam 10. Selection of a number of similar zones for attachment of the cab section 14 upon underframe A will provide a rigid cab assembly with a minimum of underframe preparation to receive the same.

Figure 4:
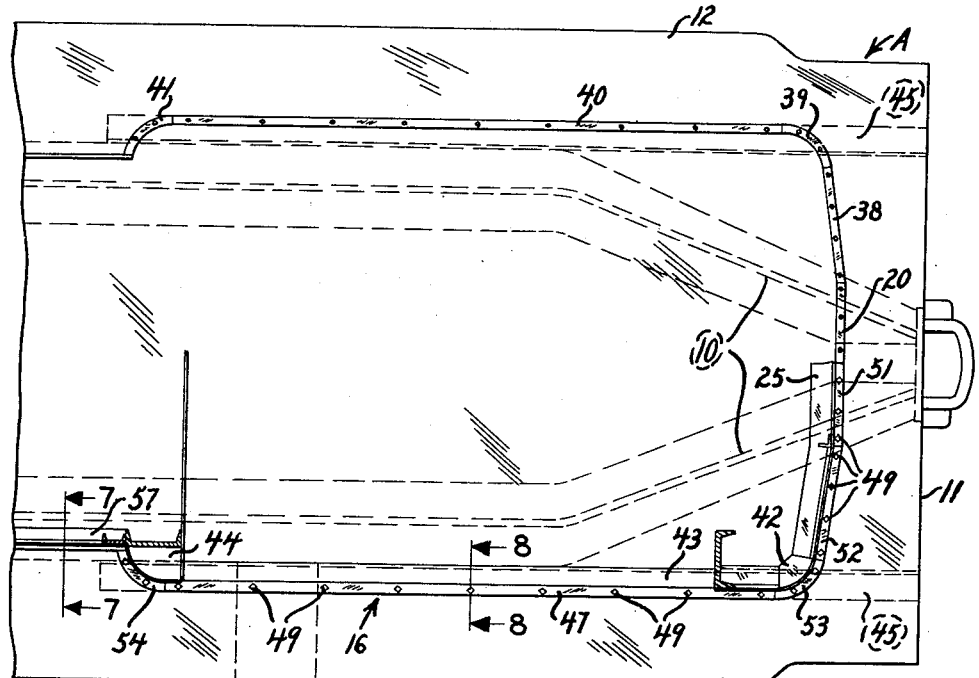
Fig. 4 is an enlarged and partly sectioned plan view of one end portion of the locomotive underframe showing the arrangement of adjacent superstructure frame members and attachment element thereon.
Figure 5:
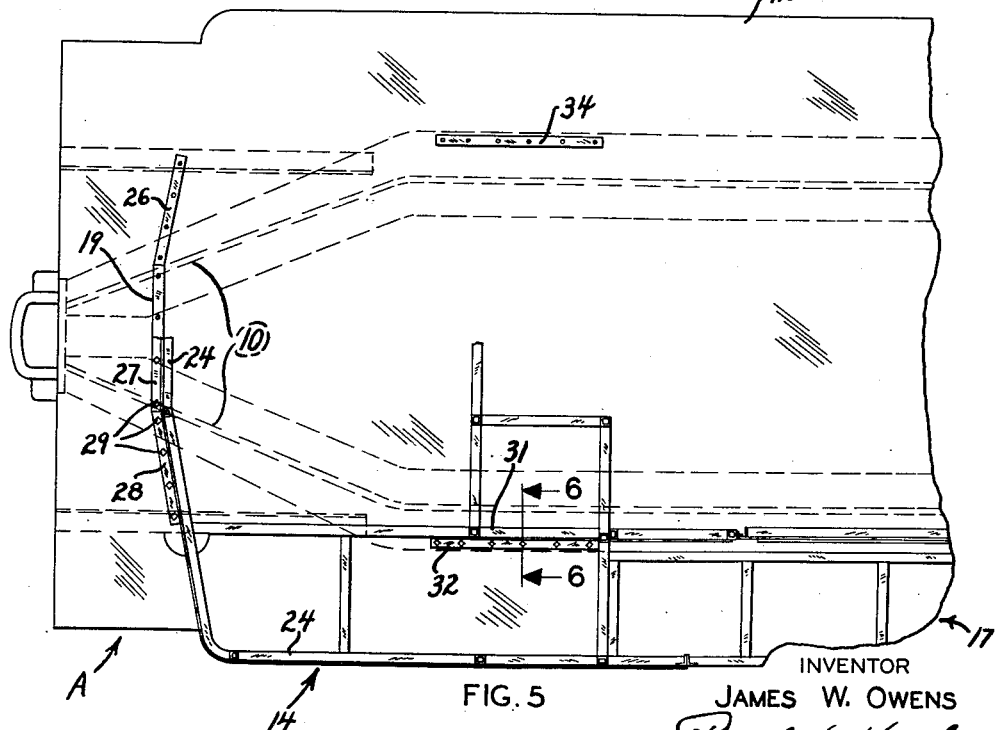
Fig. 5 is a view similar to Fig. 4 but illustrative of the attachment provisions for the opposite end portion of the underframe and adjacent portions of the superstructure.

In Fig. 4, the matched member or attachment element 20 is welded onto the underframe beams 10 and on both sides thereof are also welded in place a series of additional attachment elements, such as those shown above the longitudinal centerline of the frame at 38, 39, 40 and 41. These latter elements have symmetrically disposed counter-elements at the opposite side of the underframe, but they are not visible as the frame of the radiator housing section 16 is shown thereabove. Radiator section 16, as shown, includes a series of lower peripherally disposed angle members, such as 25, 42, 43 and 44, to which the sheet metal panels are attached. A typical example of this assembly is disclosed in Fig. 8 wherein the outer flange margin of the beams 10 carry elongate brackets 45, and these brackets support the several matched member attachment elements, such as the one 40 which is marginally welded in place at 46. The matched member attachment element 47 welded at 48 to member 43 abuts element 40 and is secured by cap screws 49 threadedly engaging element 40. Similarly the radiator matched member attachment elements 51, 52, 53 and 54 are secured to the respective underframe matched member elements 20, 38, 39 and 41 (Fig. 4). In effecting placement of the radiator section 16 on the underframe A, as above described, the lower frame angle members are spaced a distance S thereabove whereby frame irregularities may be disregarded.

In a like manner to that already made known, the machinery or engine housing sections 15 are attached to the underframe A and are also suitably attached at opposite ends to the cab section 14 and cooling radiator section 16. A typical assembly or attachment of the section 15 is shown at Fig. 7. Essentially this includes a matched member or attachment element 55 welded in place at 56 to the upper flange surface of the beam 10 and an angle element 57, in turn, welded at 58 to the element 55. The lower longitudinal margins of the frame of section 15 carry attachment plates 60 which extend downwardly for lapped abutment with element 57 and securement thereto by a series of bolts, one being shown at 61.

A typical example of the manner of securing the opposite ends of housing section 15 to adjacent sections 14 and 16 is indicated at Fig. 9. As shown, the section 14 is provided with a matched angle member 62 one leg of which is directly inwardly for matching abutment with a leg portion of a similar matched angle member 63 carried by section 15. These matched legs are then bolted together by elements 64. While not shown, the matched members 62 and 63 may be disposed along the opposite vertical margins of the adjacent sections and across the whole or portions of the crown thereof to further strengthen the final assembly.

Following this the battery box sections 17 may be assembled in any convenient manner at the opposite sides of and between sections 14 and 15, as indicated generally in Figs. 1 and 2.

Having now described and set forth a preferred manner of attaching the several components of the locomotive superstructure to the underframe A, it is also a preference, but without limitation, that the order of assembly be as follows: Underframe A initially receives the engine-generator E and cooling radiator C, whereby all operating connections and the like may be made without interference. Following this, the matched members or attachment elements 19 and 20 are located and welded in place (Fig. 3) to serve as guides for the subsequent welded assembly of the remainder of underframe attachment elements. The cab section 14 is then brought into position over the underframe A and lowered thereto until its peripheral frame member 24 is adjacent element 19 but spaced the predetermined distance S (Fig. 6) above the underframe. Thereafter, the cab 14 may be secured to the underframe at all of the zones indicated in connection with the description relating to Fig. 5. This is accomplished by placing the cab mounted matched elements in abutment with the underframe elements and then welding these cab elements in place. Cap screws 29 may then be placed in position.

The same procedure is followed for the radiator section 16, it being carefully observed that the underframe element 20 is used as a guide in so doing, and that the gap or space S (Fig. 8) is maintained substantially the same as for cab section 14. The several radiator section attachment elements may then be welded in positions and secured to the matched underframe elements by cap screws 49.

Thereafter, the machinery sections 15 for the engine-generator E may be brought into position between the cab 14 and radiator housing 16 and secured to these as shown in Fig. 9. Securement to the underframe A is accomplished by welding the attachment angle elements 57 (Fig. 7) to the underframe elements 55 the required distance S above the same, and bolting the attachment plates 60 to angle elements 57. The battery boxes 17, and all external skirts, gutters, trim pieces, and the like (not shown) may then be fitted and secured to complete the assembly.

It will be observed that the present improvements provide the necessary means for obtaining tight fits along the margins of the several housing sections 14, 15 and 16 where they are secured in juxtaposition with the underframe. A good example of this is shown in Fig. 4 and a typical detail thereof at Fig. 8, where the radiator is rendered fully air tight along its lower margin.

The foregoing description has been given by way of explanation as to the nature of the invention and one important application in the case of locomotive construction. In the interest of volume production of locomotives it is imperative that costs be maintained low and ease of fabrication and assembly be promoted. It is generally recognized that the underframe structures A will exhibit a certain degree of unevenness and irregularity, especially in its upper surface, together with some slight warpage due to welding heat and other causes. However, this condition may be anticipated with reasonable accuracy so that the items of superstructure may be adjusted therefor. The improvements hereof pertain to the provision of a plurality of spaced attachment elements which are adapted to be pre-matched and then permanently attached to portions of the underframe and superstructure. These pre-matched elements are detachably related so that the superstructure can be removably mounted. The elements provided hereby eliminate any need for machining extensive surfaces of the underframe to remove irregularities, and permit the physical separation or spacing of the superstructure in an amount adequate to assure an even rectilinear superstructure assembly which is independent of underframe irregularities and sag due to loading thereof. There is thus eliminated the defects found in connection with the prior mechanical or welded types of assemblies where the loading of the underframe produces superstructure deformation, despite machining of the underframe to correct for surface irregularities and other causes.

In a like manner, interchangeability of superstructure components is readily achieved by the use of pre-matched elements. This is important, as the service and maintenance costs of locomotives may be kept to a minimum.

It will now be fully appreciated that the present improvements have particular utility in connection with locomotive construction and assembly, but it is also apparent that the underlying principles can be applied to the general construction of other types of machinery, buildings, ships, and the like, and may provide a ready solution for a great many other construction and assembly problems and difficulties not specifically mentioned. Accordingly, it is intended that all reasonable changes, modifications and alterations from that disclosed herein be covered in the scope of the invention as the same may be defined by the annexed claims.

What is claimed is:

1. The method of mounting a housing upon a locomotive underframe structure presenting an upper mounting surface characterized generally by surface irregularities and by unevenness of surface extent due to underframe warpage and sag consequent to the weight of the underframe and underframe loading by engine and auxiliary machinery supported thereon, said method comprising providing a plurality of paired, cooperating mounting elements, forming the cooperating elements of each pair to present matching surfaces, rigidly securing one element of each pair in predetermined position on the mounting surface of the underframe, locating the housing over the underframe and in the intended final assembly position thereof with the lower marginal portions of the housing adjacent the elements secured to the underframe and spaced above the underframe mounting surface, disposing the remaining elements of the pairs thereof on those secured to the underframe and with the matching surfaces of the paired elements in engagement, then securing the said remaining elements to the lower marginal portions of the housing, and thence removably attaching the paired elements together.

2. Locomotive construction comprising the combination of an underframe for the support of items of machinery on its upper surface, a plurality of separable housing sections adapted for positionment adjacent the underframe in cooperative relation to form a superstructure, and superstructure attachment means including a series of continuous elements secured on the upper surface of said underframe adjacent the lower marginal zones of each housing section, a second series of continuous elements for selective location and securement adjacent lower marginal zones of said housing sections, said first and second series of elements being formed with pre-matched surfaces of abutment, and removable means to connect the elements together, the elements when in abutment serving to maintain said housing sections a predetermined distance above the upper surface of said underframe.

3. Locomotive construction comprising the combination of an underframe having an upper longitudinally extending surface for the support of an engine unit and an engine cooling radiator and fan unit, a locomotive superstructure assembly including a cab housing, engine housing and cooling radiator housing, continuous attachment elements secured one at each end zone of said underframe, a matched attachment element selectively secured to the lower marginal zone of the cab housing for cooperative abutment with one of said first-mentioned continuous elements in positioning the cab, a matched element selectively secured to the lower marginal zone of said cooling radiator housing for cooperative abutment with the opposite one of said first-mentioned continuous elements to locate the cooling radiator housing, said cab and radiator housing being thereby located in longitudinally spaced relation to receive said engine housing therebetween, means to removably secure each of the housing sections to the surface of the underframe along the length thereof in substantially airtight relationship therewith at a predetermined spacing above the underframe surface to compensate for the sag of said surface under loading, said means including continuous elements welded to the underframe surface adjacent the lower marginal edges of each housing, cooperative pre-matched elements selectively secured to the respective housings for abutment with the elements on the underframe surface, and holding elements connecting said pre-matched abutting elements to removably secure each of the housing sections to the surface of the underframe along the length thereof, the selective positioning of elements and their abutting surfaces serving to maintain the housing section a predetermined spacing above the upper surfaces of the underframe, and means adapted to secure the opposite ends of said engine housing to adjacent margins of said cab and cooling radiator housings.

JAMES WHITFIELD OWENS.

REFERENCES CITED

The following references are of record in the file of this patent:

UNITED STATES PATENTS

| Number | Name | Date |
|---|---|---|
| 1,691,797 | Burkhardt et al. | Nov. 13, 1928 |
| 1,785,626 | Harwick | Dec. 16, 1930 |
| 1,893,699 | Dunning | Jan. 10, 1933 |
| 2,180,149 | Kjolseth | Nov. 14, 1939 |
| 2,370,237 | Essl | Feb. 27, 1945 |
| 2,401,606 | Brown | June 4, 1946 |